United States Patent [19]

Durbin et al.

[11] Patent Number: 4,511,696

[45] Date of Patent: Apr. 16, 1985

[54] METHOD FOR PROTECTIVELY COATING A POLYMER

[75] Inventors: Daniel P. Durbin; William H. Korcz, both of Houston, Tex.

[73] Assignee: Shell Oil Company, Houston, Tex.

[21] Appl. No.: 508,776

[22] Filed: Jun. 29, 1983

[51] Int. Cl.³ .................. C08L 53/00; C08L 77/00
[52] U.S. Cl. ................................. 525/92; 525/184
[58] Field of Search ............................. 525/92, 184

[56] References Cited

U.S. PATENT DOCUMENTS 4,018,731 4/1977 Sims .................................. 525/184
4,447,516 5/1984 Matkan .............................. 430/137

OTHER PUBLICATIONS

Block and Graft Copolymerization, vol. 1, Dept. of Chemistry and Polymer Technology, The Polytechnic of the South Bank, London.

*Primary Examiner*—John C. Bleutge
*Assistant Examiner*—A. L. Carrillo
*Attorney, Agent, or Firm*—Peter A. Bielinski

[57] ABSTRACT

Polymers or polymer formulations normally having a tacky or porous surface may be protectively coated by interfacially polymerizing a second polymer onto the surface of the first polymer.

5 Claims, No Drawings

METHOD FOR PROTECTIVELY COATING A POLYMER

FIELD OF THE INVENTION

This invention relates to a method for protectively coating solid polymers or polymer formulations. More particularly, this invention relates to a method for protectively coating a polymer or polymer formulation comprising interfacially polymerizing a second polymer onto the surface of a first polymer and to the coated polymers produced thereby.

BACKGROUND OF THE INVENTION

In the past many polymers have had processing and/or handling problems due to specific troublesome properties associated with the surface of these polymers. Polymers used for adhesives applications or formulated adhesives especially when shipped in pelletized bulk form, for example, styrene isoprene block copolymers exhibit a high surface tack which allows the pellets to stick together during shipping and makes subsequent handling very difficult. This problem typically called blocking may also be encountered with polymers not used as adhesives. In another area many polymers entrain the wash medium during the finishing steps in a polymerization process and make drying the polymer after washing more expensive and time consuming.

DESCRIPTION OF THE INVENTION

It is an object of the present invention to provide a method for protectively coating a polymer so that the coated polymer will not have detrimental properties associated with the surface of the first polymer such as blocking, moisture entrainment, etc.

According to the present invention there is provided a method for protectively coating a polymer comprising interfacially polymerizing a second polymer onto the surface of a first polymer thereby providing a new surface which does not have properties which would negatively affect the polymers subsequent use.

The present invention involves the use of interfacial polymerization to produce coated particles or particles within a protective shell, which are useful for extrusion molding. This process can produce, for example, non-tacky adhesive pellets that are free flowing.

Any polymers can be coated which would benefit from having a non-tacky, non-porous outer coating or shell. Polymers or polymer formulations which can be coated include, for example, polymers used in pressure sensitive adhesive and hot melt adhesive applications such as block copolymers, for example, styrene-isoprene and styrene-butadiene block copolymers.

The coating or outer layer can be any condensation polymer wherein at least one of the reactive phases wets the surface of the polymer to be coated. Examples of possible coating polymers include polyamides, polyurethanes, polyureas, polysulfonamides, poly(phenol esters), etc.

An attractive embodiment of the invention involves the interfacial polymerization of Nylon 610, a polyamide, onto the surface of styrene-isoprene diblock copolymer. Significant handling difficulties are typically encountered with styrene-isoprene block copolymer, for adhesives applications. The copolymer is not free flowing, and especially after shipping, the copolymer pellets must be mechanically separated sometimes with great difficulty.

EXAMPLES

Adhesive pellets which are normally compounded with a tackifying resin and a polymer will be simulated by pure styrene-isoprene copolymer and a commercial styrene-butadiene block copolymer, both of which have tacky properties. The fundamental interfacial polymerization reaction involved is:

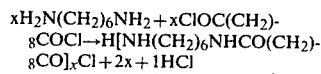

The reagents used were as follows:
Hexamethylene, diamine, Aldrich Chemical Company, Catalog No. H1,169-6 Red Label;
Sebacoyl chloride, Aldrich Chemical Company, Catalog No. 13,178-4 Red Label;
Tetrachloroethylene, Aldrich Chemical Company, Catalog No. 15,499-7 Gold Label;
Acetone, technical grade; Methanol, technical grade; Potassium hydroxide, pellets.

0.02 moles (3.2 grams) of hexamethylenediamine and 0.04 moles (2.3 grams) of potassium hydroxide were dissolved in 330 milliliters of distilled water and placed in one beaker. 0.02 moles (4.78 grams) sebacoyl chloride were dissolved in 250 milliliters of tetrachloroethylene and placed in a second beaker.

The styrene-isoprene block copolymer material was cut into strips which were consecutively dipped into the tetrachloroethylene/sebacoyl chloride solution for several seconds then into the $H_2O$/hexamethylenediamine/KOH solution for several seconds. The samples were then washed by dipping into a 1 to 1 mixture of water and methanol. The samples were allowed to air dry at room temperature. After drying the tackiness originally present with the styrene-isoprene diblock copolymer was completely eliminated by the presence of the thin nylon layer.

In a second experiment, commercial styrene-butadiene block copolymer pellets were placed in a small 100 mesh screen basket. The basket containing the pellets was consecutively dipped in the same sequence of reagents as above and air dryed again at room temperature. Tackiness in the dried pellets was again completely eliminated.

The embodiments described above are intended to be exemplative only and not limiting, and it will be appreciated from the foregoing by those skilled in the art the many substitutions and variations may be made in the disclosed method without departing from the spirit and scope of the claims.

What is claimed is:

1. A method for protectively coating particles of a polymer selected from the group consisting of styrene, isoprene block copolymer formulations and styrene, butadiene block copolymer formulations, comprising interfacially polymerizing a second polymer onto the surface of said particles, wherein said second polymer is a condensation polymer selected from the group consisting of polyamides, polyurethanes, polyureas, polysulfonamides and poly(phenol esters).

2. The method of claim 1 wherein said second polymer is nylon.

3. The method of claim 1 wherein said polymer particles are particles of a pressure sensitive adhesive or its precursor.

4. The method of claim 1 wherein said polymer particles are particles of a hot melt adhesive or its precursor.

5. The coated polymer produced by the method of claim 1.

* * * * *